United States Patent [19]

Schwab et al.

[11] 3,867,295

[45] Feb. 18, 1975

[54] BLOCK COPOLYMERS AND LUBRICANT COMPOSITIONS CONTAINING THE SAME

[75] Inventors: Frederick C. Schwab, Metuchen; Israel J. Heilweil, Princeton, both of N.J.

[73] Assignee: Mobil Oil Corporation, New York, N.Y.

[22] Filed: Aug. 13, 1973

[21] Appl. No.: 387,845

[52] U.S. Cl............ 252/33.4, 252/33.6, 252/42.1, 252/47.5, 252/48.6, 252/49.6, 252/51.5 R, 252/52 A, 252/56 R, 260/827, 260/874, 260/887

[51] Int. Cl..... C10m 1/40, C10m 1/38, C10m 1/28

[58] Field of Search............ 252/33, 33.4, 33.6, 41, 252/47.5, 48.6, 51.5 R, 52, 56 R, 49.6, 52 A; 260/874

[56] References Cited
UNITED STATES PATENTS

| | | | |
|---|---|---|---|
| 3,404,092 | 10/1968 | Jacobson et al. | 252/51.5 R |
| 3,791,971 | 2/1974 | Lowe et al. | 252/52 A |

*Primary Examiner*—W. Cannon
*Attorney, Agent, or Firm*—Charles A. Huggett; Raymond W. Barclay; Stanley A. Strober

[57] ABSTRACT

Block copolymers are prepared by (1) anionic polymerization of an alkyl-substituted styrene, the alkyl group having at least 4 carbon atoms, or a hydrogenated block or random butadiene-styrene copolymer in the presence of an organometal catalyst of the alkali metal series and (2) addition to the reaction product resulting from this polymerization an alkylene oxide in sufficient amount to produce from 1% to about 50% by weight of a second block copolymerized with the first as an AB or BAB copolymer. These copolymers have molecular weights in the range of from about 1,000 to about 300,000 and perform as multifunctional additives in industrial organic compositions, providing such utility as detergency and viscosity index improvement. Copolymers capped with diisocyanate have excellent thermal and oxidative stability.

12 Claims, No Drawings

BLOCK COPOLYMERS AND LUBRICANT COMPOSITIONS CONTAINING THE SAME

BACKGROUND OF THE INVENTION

1. Field of the Invention

This invention relates to "block copolymers" suitable for use in organic fluid compositions. In particular, this invention relates to oil soluble copolymers composed of an oil soluble polymer and a block of a polar polymer and fluid compositions containing the same.

2. Description of the Prior Art

U.S. Pat. No. 3,050,511 describes block copolymers obtained from polystyrene and alkylene oxide. The technique involves forming a "living polymer" of the styrene in the presence of an anionic catalyst, then adding the alkylene oxide to it. Such products, however would not be suitable as hydrocarbon fluid additives. They would have insufficient solubility in lubricating oils during use to retain their effectiveness. U.S. Pat. No. 3,219,725 describes block polymers of oxymethylene and styrene or alpha-methylstyrene by polymerizing styrene and adding formaldehyde to produce a polyoxymethylene block. It is understood that the resulting block copolymer may be terminated by esterification or etherification. Olefin oxide, higher aldehydes, isocyanates and the like may replace the styrene. Again, the use of styrene polymer as the first block-forming monomer or replacement by a polar monomer would not produce a useful multifunctional additive for lubricating oils. U.S. Pat. No. 3,281,499 describes block copolymers of oxymethylene and olefins, such as styrene. The resulting products are moldable polymers which are of little utility in lubricating oils or other organic fluids. U.S. Pat. No. 3,318,813 describes a tert-butyl-styrene polymer prepared in an anionic polymerization using n-butyl lithium as the initiator. Polymerization is terminated in methanol. This polymer is said to be useful as a viscosity index (VI) improver. The polymers used in this reference contain no polar groups. Hence, these homopolymers are distinguishable from the copolymers of the present invention. U.S. Pat. No. 2,835,658 describes treating styrene-lactone block polymers with diisocyanates. The polymers are elastomers prepared from free-radical bulk polymerization. British Pat. No. 1,304,289 describes hydrogenated butadiene-styrene copolymers as VI improvers. These polymers contain no polar polymer blocks.

SUMMARY OF THE INVENTION

Applicants have now discovered oil soluble block copolymers of the AB or BAB type, wherein A is a block of an oil soluble polymer of polystyrene having at least one alkyl group attached to the nucleus containing at least 3 carbon atoms or a hydrogenated copolymer of a diene and styrene or alkylstyrene, and B is a block of a polar polymer of poly(alkyleneoxide) or poly(alkylene sulfide), wherein the B block constitutes approximately 1% to about 50% by weight of the copolymer. These copolymers may contain end groups, Z, which may either be hydroxy, alkoxy, metaloxy of the alkali metal series, carboxylate, carbamate, urethane, halocarbonyl or heterocyclic nitrogen. Organic industrial fluid compositions containing such polymers have improved combined detergent and viscosity index characteristics.

DESCRIPTION OF SPECIFIC EMBODIMENTS

The copolymers prepared from the alkyl styrene or hydrogenated diene-styrene polymers and the polyalkylene oxide or sulfide are generally of the AB or BAB types. Included in the BAB category are also

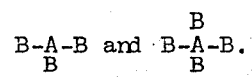

In the first step of producing the copolymers of this invention, an alkyl styrene or a mixture of preferably butadiene and styrene is polymerized by anionic polymerization to form the A polymer. The initiator for this reaction is an organometal compound of the alkali metal group: lithium, sodium, potassium, cesium and rubidium. The formula for these initiators is $RM_y$, wherein R is organo, mono- or polyvalent and may be alkyl, alkenyl, aryl, aralkyl, and alkaryl, and may contain from 1 to about 50 carbon atoms; and $y$ is 1 to 4, and preferably 1 or 2. Such initiators as methyl lithium, ethyl lithium, methyl sodium, propyl lithium, n-butyl lithium, sec-butyl lithium, tert-butyl lithium, butyl sodium, lithium naphthalene, sodium naphthalene, potassium naphthalene, cesium naphthalene, phenyl sodium, phenyl lithium, benzyl lithium, cumyl sodium, cumyl potassium, methyl potassium, ethyl potassium, and so forth may be used in this reaction. Also, metal initiators containing a dianion, such as the alkali metal salts of 1,1-diphenylethylene and alpha-methyl-styrene tetramer and the radical anion initiators of the sodium naphthalene type, could lead to the formation of the BAB copolymer. It is known in anionic polymerization that each molecule of the initiator starts one anionic polymer chain; it is also known that a multiple anion can permit addition of a second polar block on the A polymer.

The anionic polymerization reaction is carried out in the presence of either a polar or nonpolar solvent. Suitable solvents include hexane, heptane, octane, benzene, toluene, xylene, tetrahydrofuran, ethyl ether, methyl ethyl ether, 1,4-dioxane, and other alkanes, ethers and aromatic solvents, oils and mixtures thereof. Tetrahydrofuran is the preferred solvent, since it is an excellent solvent for both polymerization steps in this invention.

In the preparation of the poly(alkyl styrene), block A, the alkyl styrene is dissolved in solvent and polymerized in the presence of from $10^{-1}$ to $10^{-4}$ mole of anionic initiator per 100 grams of the alkyl styrene. The alkyl styrenes useful in this phase of the invention include propylstyrene, n-butylstyrene, i-butylstyrene, t-butylstyrene, n-amylstyrene, i-amylstyrene, hexylstyrenes, heptylstyrenes, methylpropylstyrene, methylbutylstyrene and the like. The butyl styrenes are most preferred. Mixtures of different alkylstyrenes or an alkylstyrene with styrene may also be used, preferably in a ratio to provide an average of at least 2 carbon atoms of the alkyl substituent per nucleus. Polymerization is carried out for sufficient period of time to provide a block of poly(alkylstyrene) until no further polymerization occurs. Molecular weights in this first step may range from 1,000 to over 250,000. The final group on the living polymer consists of —OM derived from the organometal initiator. It is understood that this group permits addition of the polar block B in the subsequent polymerization step. The term "living polymer" is meant to indicate that the polymerization reaction involving the alkylstyrene (and also the diene-styrene copolymer) continues until no further monomer remains. One polymer chain starts with each equivalent of the initiator and uses up available monomer until depletion thereof. Control of molecular weight is achieved by adjustment of styrene/initiator ratio.

The presence of the alkyl group on the styrene is believed to permit adequate solubility of the final resulting copolymer in petroleum-base liquids, or liquids used as synthetic fuels and lubricants, and also to contribute to the reduction of rigidity in such products. The diene-styrene and diene-alkylstyrene copolymers also possess the desirable solubility in petroleum and other industrial fluids and may be used as block A. Such dienes as preferably butadiene and isoprene, and also 2,3-dimethylbutadiene, 2,3-diphenylbutadiene, and others of the structure

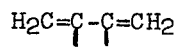

the dangling valences being substituted by hydrogen or alkyl or aryl groups of 1 to 10, and styrene or the aforementioned alkylstyrenes provide suitable copolymers in this aspect of the invention.

To illustrate the polymerization of the diene and styrene copolymers, the following description will refer to the butadiene-styrene system as representative of this aspect of the invention. This polymerization may be carried out either in a random or a block polymerization. Upon completion of the polymerization of the butadiene and styrene, since there are vinyl groups remaining in the molecule which could become oxidized or susceptible to other forms of deterioration during use, it is desirable to terminate the initial copolymerization by adding a small amount of the polar compound of block B, such as ethylene oxide, followed by a small amount of mineral acid or acetic acid and subjecting it to hydrogenation. Hydrogenation is carried out in the presence of a heterogeneous hydrogenation catalyst, such as a metal of the platinum series including platinum, palladium, and the like. Other hydrogenation catalysts include iron, cobalt, or nickel, particularly Raney nickel, and organic salts of these metals, such as nickel diisopropylsalicylate, nickel naphthenate and nickel ethyl hexanoate. The catalyst metals may be used alone or on a carrier, such as charcoal, silica, alumina and the like. Homogeneous catalysts may also be used; these include tris(triphenyl) phosphine rhodium chloride and group VII metals or their compounds, particularly a compound obtained by reacting an aluminum trialkyl with a nickel or cobalt organic salt, such as aluminum triisobutyl with nickel naphthenate or 2-ethyl-hexanoate.

The units of butadiene and styrene in the oil soluble block may contain from 5% to 60% styrene units based on the total number of units of butadiene and styrene together; most preferably between 20% and 55% styrene is present. The hydrogenation catalyst is present in the amount of from about 0.01% to about 10% by weight of the polymer, preferably 0.1% to about 5%. U.S. Pat. No. 3,294,768 discloses a number of catalysts useful in forming butadiene-styrene adducts and hydrogenating them.

The next step in formation of the block copolymers of this invention is to react block A polymer, either the poly(alkyl styrene) or (PAS) or the hydrogenated butadienestyrene copolymer or (HBDS), with the polar compound. In the first case, the alkylene oxide or sulfide is added directly to the PAS solution. In the latter case the HBDS copolymer is preferably separated from the hydrogenated reaction mass and redissolved in a solvent and additional anionic catalyst is added. The number of moles would be approximately the same as that used for the anionic initiator. To the A polymer solution is added from 1% to 50%, and preferably from 5% to 25%, by weight of the polymer of an alkylene oxide or sulfide, such as ethylene oxide and ethylene sulfide. Ethylene oxide is most preferred for cost, availability and performance characteristics. The carbon atoms attached to the oxygen, atom are vicinal and each of these carbon atoms may be substituted by other carbon atoms, the total number of carbon atoms preferably ranging from 2 to 5. Therefore, also suitable would be 1,2-propylene oxide, 1,2-butylene oxide, 2,3-butylene oxide, and the like, however, the rate of reaction may be slower with these oxides.

The living PAS polymer or HBDS copolymer is reacted with the polar compound which adds oxyalkylene or thioalkylene groups at the metaloxy or metalthio terminus, $-CH_2-CH_2-OM$ or $-CH_2CH_2-SM$, to produce AB block copolymers having at least 2 and up to about 3,500 such polar groups.

Schematically, such structures may be

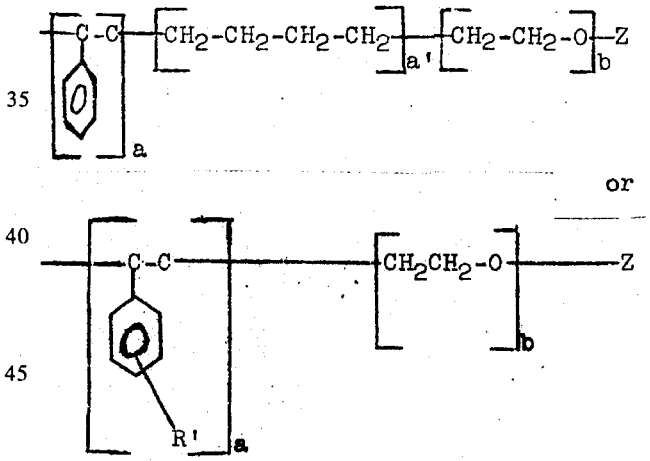

Thus, the block copolymers of the invention consist essentially of polymerized styrene-type block having an average molecular weight of between 1,000 to about 300,000 and a polar portion, preferably polyoxyalkylene, having from 2 up to about 3,500 units, preferably 10 to 1,000 units. Preferred molecular weights of the copolymer of this invention may range from about 1,000 to about 300,000 and preferably from 10,000 to about 200,000.

The polar block B is terminated by precipitating the copolymer in a lower alkyl alcohol, i.e., from 1 to 5 carbon atoms, such as methanol, or by adding a compound containing a carbonyl group, such as an organic acid, an isocyanate or a carbonyl halide, such as cyanuric chloride and phosgene, and then precipitating the polymer. The end or capping group, Z above, may be hydroxy, metaloxy of the alkali metals, alkoxy of from 1 to 10 carbon atoms, carbonyl and substituted carbonyl, or a heterocyclic nitrogen group of pyridine, pyrimidine or triazine. The preferred capping group is prepared by reacting the polymer with an isocyanate, preferably an aromatic diisocyanate, such as toluene diisocyanate (TDI), to form a urethane group at the end of the block copolymer. The second O=C=N-group may either remain unreacted or reacted with other compounds or may even be used to cap a second copolymer chain, for example AB—TDI—BA. This cap provides unusually excellent thermal and oxidative stability to the polymer during use. It is usually in the form of an anion, such as the alkali metal of the initiator,

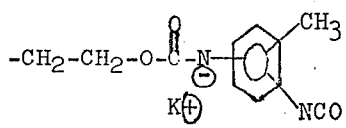

using potassium as the preferred example. Other capping groups consist of hydroxy or metaloxy derived from the metal of the anionic initiator, or another metal substituted by exchange reaction, or from cyanuric halide, dihalopyrimidine, halopyridine, and the like or halocarbonyl. These polyfunctional capping agents may also couple more than one AB polymer molecule, as TDI above.

The styrene polymerization reaction may be conducted at a temperature in the range of from −80°C, to 100°C., but ordinarily room temperature is the desired maximum. The reaction may be terminated within a period of from 15 minutes to over about 4 hours. The second reaction with alkylene oxide or sulfide may be conducted at a temperature of from 0°C. up to about 100°C., and the time of reaction may range from about half an hour to about 24 hours. The products are removed by filtering the copolymer from the solvent or by adding a hydrocarbon oil in which the copolymer can be used or a process oil and removing the more volatile solvent by stripping or other known means. Should a capping group other than —OM be desired, the reactant providing the group is added to the reaction mixture prior to such separation and the mixture is heated. The metal halide or oxide side product may be removed by washing and/or filtration.

The products of this invention are multifunctional additives for industrial organic liquids. Because of the high molecular weights of these polymers, they provide high viscosity index oil compositions which may perform as cross-graded lubricants. Thus, the oil compositions of this invention may be used both under high and low temperature conditions, since the higher the viscosity index the more stable the viscosity flow at extreme temperatures. One of the drawbacks of using certain polymers, such as polymethacrylates, as viscosity index improvers is that under the shearing conditions in an engine, the polymer chains may be destroyed resulting in lower viscosities, and possible breakdown of the additive package in oil. Serious viscosity loss may cause the engine to work inefficiently. It has been surprisingly discovered that the block copolymers of this invention have minimal loss in shear stability.

Another valuable function performed by these copolymers is their ability to disperse particles in the lubricant and to prevent them from becoming desposited on engine surfaces. Although applicants are not certain of the mechanism of this dispersive ability, it is believed that the combination of oil soluble and polar portions of the macromolecule permits the polymer both to remain dissolved in the oil and yet attract and hold polar particles in the oil. These two characteristics are necessary to keep the oil free of such interfering particles affecting engine performance.

The additives of this invention may be used in conjunction with other additives normally used in lubricant, such as basic alkali or alkaline earth metal sulfonates and phenates, alkenylsuccinic acid imides, esters or salts, the polymethacrylates, sulfurized olefins such as isobutylene, and phosphites, dithiophosphates, carbamates and the like. additional antioxidant, extreme pressure, viscosity improving properties and detergency may be thus obtained.

The following examples illustrate the manner of preparing the block copolymers of this invention and the evaluation of such copolymers in organic industrial liquid compositions:

EXAMPLES

EXAMPLE 1

Into a 2,000-ml four-necked flask was distilled 1,000 ml of dried tetrahydrofuran (THF) under vacuum at −78°C. Nitrogen gas was passed through the reactor. The THF was treated with about 30 drops of 0.5 M solution of cumyl potassium in THF. Then 6.6 ml of the 0.5 M cumyl potassium solution were added to the reactor. To the solution was added 80 grams (0.5 mole) of t-butylstyrene through a dropping funnel at −78°C. The polymerization was allowed to proceed at this temperature for approximately 1 hour. To the resulting reaction mixture was added 20 grams (0.45 mole) of ethylene oxide which had been dried over calcium hydride. The reaction mixture was allowed to react without temperature control and proceed at room temperature for 16 hours. The reaction was terminated by adding to the resulting copolymer 2 ml of methanol and the solvent was replaced by a process oil. The product is an AB block polymer having the following characteristics:

$M_n = 20,850$
$M_w = 28,040$
$M_w/M_n = 1.35$

EXAMPLE 2

Using a procedure similar to that of Example 1, t-butylstyrene and ethylene oxide were copolymerized to form an AB block polymer, except that 40 grams (0.25 mole) of t-butylstyrene was polymerized in the presence of 8.5 ml of 0.6 M cumyl potassium solution in THF and 10 grams (0.227 mole) of ethylene oxide was copolymerized with it. The block copolymer has the following characteristics:

$M_n = 5,700$
$M_w = 6,800$
$M_w/M_n = 1.2$

It should be noted that the difference in molecular weights between the copolymer of Example 1 and that of Example 2 is due to the higher ratio of monomer to initiator in the first example. The lower ratio copolymer would indicate the formation of more short chains and hence, the lower molecular weight. Copolymers having specific desired properties may be produced by controlling this ratio and the ratio between the oleophilic and polar monomers.

EXAMPLE 3

Into a 2,000-ml flask, 300 ml of hexane was added under a nitrogen blanket. Into the flask was distilled under vacuum at −78°C. 150 grams (2.5 moles) of purified butadiene followed by a solution of 50 grams (0.48 mole) of styrene in 800 ml of benzene. The reaction flask, still under a nitrogen blanket, was allowed to warm to room temperature. To the reaction flask was then added 100 ml of a 0.31 M solution of n-butyl lithium containing 0.384 grams of potassium t-butoxide. The reaction flask was maintained at room temperature for 16 hours following this addition during which time polymerization occurred. The polymerization was terminated by the addition of 0.6 gram of ethylene oxide and 2 ml of glacial acetic acid, and the polymer was removed by filtration.

A solution of 105 grams of the resulting polymer in 370 ml of benzene was subjected to hydrogenation by adding 15 grams of a catalyst consisting of 10% by weight of palladium on charcoal and passing hydrogen gas through the reactor at 80°C. and 400 psi for 16 hours. The catalyst was filtered off from the polymer solution. To the filtrate was added 0.704 gram of potassium t-butoxide under a nitrogen blanket and the solution was heated to reflux; 40 ml of benzene was distilled off. To the resulting solution was added 18 grams (0.4 mole) of ethylene oxide by distilling in the ethylene oxide under vacuum. A nitrogen atmosphere was then applied, and the reaction allowed to proceed at 78°C. for 5 hours. After polymerization of the ethylene oxide was completed, 70 grams of a process oil was added and the benzene stripped off under vacuum.

The resulting polymer now in the oil solution had the following properties:
$M_n = 3,100$
$M_w = 19,100$
$M_w/M_n = 6.2$

EXAMPLE 4

Using a procedure similar to that of Example 1, except that the amount of ethylene oxide added was only 10% of total monomers instead of 20%, the final copolymer product was reacted with 2 ml of acetic acid. The end group of the copolymer is understood to be —CH$_2$CH$_2$OH, while those for Examples 1 and 2 have end groups of —CH$_2$CH$_2$OK. The molecular weight analysis is as follows:
$M_n = 5,800$
$M_w = 6,600$
$M_w/M_n = 1.1$

EXAMPLE 5

A copolymer was prepared using the same procedure as in Example 1, except that only 10% of the ethylene oxide based on total monomers was used. To the resulting polymer solution was added 0.9 gram (6 × 10$^{-3}$ mole) of toluene diisocyanate (TDI) at a temperature of 25°C. The end group in this polymer consists of anionic urethane-potassium group having a free isocyanate group. The molecular weight analysis of the product is as follows:
$M_n = 9,300$
$M_w = 15,800$
$M_w/M_n = 1.7$

EXAMPLE 6

A copolymer prepared by using a procedure of Examples 4 and 5 was reacted with 0.93 gram (5 × 10$^{-3}$ mole) of cyanuric chloride, leaving a triazinyl end group. The molecular weight analysis is as follows:
$M_n = 7,600$
$M_w = 10,100$
$M_w/M_n = 1.3$

EXAMPLE 7

A copolymer prepared as in the preceding examples having an OK end group was reacted with amino dichloropyrimidine leaving an amino-pyrimidinyl end group. The molecular weight analysis is as follows:
$M_n = 6,500$
$M_w = 9,700$
$M_w/M_n = 1.5$

EXAMPLE 8

Another copolymer prepared as in the previous examples was reacted with trimethoxysilane, leaving the following end group:

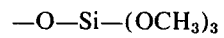

$$-O-Si-(OCH_3)_3$$

The molecular weight analysis is as follows:
$M_n = 7,100$
$M_w = 10,700$
$M_w/M_n - 1.5$

EVALUATION OF PRODUCTS

The products of this invention evidence properties of viscosity index improvement accompanied by excellent shear stability and surprising detergency in both bench and engine testing. The tests used to demonstrate these properties are the shear stability test and measurement of thickening power and carbon removal tests and deposit formation tests.

VISCOSITY CONTROL

To indicate the shear stability of the oil compositions of this invention, oil formulations are subjected to a series of shearing forces and the viscosity is measured after each shearing period, or pass. A shear stable formulation will evidence little or no loss in viscosity.

The conditions of the shear stability test are as follows: About 250 cc of the test oil formulation of known viscosity is passed through a standard Diesel engine fuel injector 10 times and the final viscosity is measured. The injector contains seven orifices of 0.006-inch diameter each. The test is run at ambient temperature at about 40,000 to 50,000 psig.

The results of these tests on a solvent refined oil containing the block polymers of this invention are tabulated below. In these tables, the polymers are referred to by the following shortened terms: TBS-EO, t-butyl styrene/ethylene oxide copolymer; HBDS-EO, hydrogenated butadiene-styrene/ethylene oxide copolymer; OK, oxypotassium end-group; TDIK, toluene diisocyanate-potassium end-group; OH, hydroxy end-group. Other terms referred to are: VI, viscosity index; MW, molecular weight; SSI, shear stability index (see Rohm and Haas Company Bulletin "Acryloid 700 Series," September, 1970) which is calculated by $[(v_1 - v_f/(v_1 - v_o)] \times 100$, wherein $v_1$ is initial viscosity of the formulation, $v_f$ is viscosity after the test, $v_o$ is viscosity of oil formulation without the viscosity improving additive, the lower the number the more effective the additive; and TP, thickening power or increase in viscosity at 210°F. per weight percent of additive.

TABLE I

| Test No. | Polymer/MW | Conc. % by wt. | VI | SSI %* | TP |
|---|---|---|---|---|---|
| 1 | none** / — | — | 100 | — | — |
| 2 | TBS-EO-TDIK/ 28,000 | 5.0 | 178 | 5 to 10 | 1.43 |
| 3 | TBS-EO-OH/ 60,000 | 5.0 | 220 | −9 | 6.03 |
| 4 | HBDS-EO-OK/100,000 | 5.0 | 169 | 0 | 8.66 |
| 5 | HBDS-EO-TDIK/ 58,000 | 3.0 | 149 | −1 | 5.15 |
| 6 | HBDS-EO-TDIK/ 74,000 | 3.0 | 150 | 5 | — |
| comp. | Butadiene-Styrene Copolymer/ 70,000 | 3.2 | 195 | 6.2 | 15.1 |

* Negative numbers indicate 0% SSI.
The base oil is a blend of solvent-refined lubricants used in producing 10W-50 oils. No other additives are present.

TABLE II

| Test No. | Polymer/MW | Conc. %bywt. | VI | SSI%* |
|---|---|---|---|---|
| 1 | Oil Formulation**/— | 0 | 100 | — |
| 2 | TBS-EO-OH/ 60,000 | 6.0 | 240 | 18 |
| 3 | HBDS-EO-OK/100,000 | 4.0 | 170 | −3 |
| 4 | HBDS-EO-TDIK/ 74,000 | 5.0 | 158 | 3 |
| 5 | TBS-EO-TDIK/ 30,000 | 3.0 | 132 | 1 |
| 6 | Polymethacrylate Copolymer/about 100,000 | 8.8 | 184 | 36 |

* Negative number indicates 0% SSI.
** Oil contains about 6% of other additives.

DETERGENT PROPERTIES

One test to indicate the ability of an additive to pick up and disperse particles in oil is the carbon removal test:

A stainless steel cylindrical cell is mounted in a constant temperature both of 100°C. Inside the cell is a 400-mesh nickel screen in which nickel powder has been placed as a porous bed. Carbon black is deposited on the bed by passing through the bed 10cc of a dispersion of 250ppm of carbon black in white oil at 1cc/min. followed by 5cc of white oil alone. A solution of a solvent-refined mineral oil containing 5% by weight of a block copolymer of this invention is passed through the bed at 1cc/min. Light transmission measurements of the oil compositions before and after passage through the bed conform to Beer-Lambert, indicating the amount of carbon black removed from the bed. The following results were obtained using the block copolymers of this invention as detergent-dispersants:

TABLE III

| Test No. | Polymer | MW | Wt. %, EO | Percent Removal |
|---|---|---|---|---|
| 1 | Oil alone | — | — | 0 |
| 2 | TBS-EO-OK | 10,000 | 20.0 | 37 |
| 3 | TBS-EO-TDIK | 101,000 | 19.2 | 36 |
| 4 | HBDS-EO-TDIK | 74,000 | 8.4 | 36 |
| 5 | HBDS-EO-OK | 100,000 | 15.0 | 20 |
| 6 | TBS-EO-OH | 10,000 | 10.0 | 52 |
| 7 | TBS-EO-TDIK | 30,000 | 20.0 | 39 |
| 8 | HBDS-EO-TDIK | 82,000 | 30.4 | 38 |
| 9 | TBS-EO-pyrimidine | 10,000 | 10.0 | 9 |
| 10 | TBS-EO-trichloro triazine | 10,000 | 10.0 | 27 |

EXAMPLE 11

In this example, t-butyl styrene is polymerized as in Example 1, except 6 ml of 1.0 M dipotassium alpha-methylstyrene tetramer solution in THF is the initiator. After 1 hour, 20 grams (0.90 mole) of ethylene oxide is added to the reaction mixture, and the reaction is allowed to proceed. About 98 grams of polymeric product is precipitated in methanol and separated by filtration. This product is a block copolymer of the BAB type.

Having described our invention in both broad terms and by specific illustrations, which invention is intended to include all obvious modifications thereof, we claim:

1. An organic fluid composition comprising a major amount of a lubricating oil and a minor amount sufficient to provide viscosity index improvement or detergent properties thereto of an oil soluble block copolymer having within its molecular structure an oil soluble segment and a polar segment said oil soluble segment having a molecular weight of about 1,000 to 300,000 and selected from the group consisting of a polymerized alkylstyrene having at least one alkyl group attached to the aromatic nucleus of at least 3 carbon atoms and a hydrogenated diene-styrene copolymer and the polar segment is selected from the group consisting of a polymerized alkylene oxide and alkylene sulfide which polar segment is from 1 percent to about 50 percent by weight of the total copolymer.

2. The composition of claim 1 wherein the oil soluble segment of the copolymer is a polymerized t-butyl styrene.

3. The composition of claim 1 wherein the oil soluble segment of the copolymer is a hydrogenated butadiene-styrene copolymer.

4. The composition of claim 1 wherein the polar segment is polymerized ethylene oxide.

5. The composition of claim 4 wherein the polar segment contains a terminal group —$CH_2$—$CH_2$—OZ wherein OZ is selected from the group consisting of hydroxy; —OM wherein M is an alkali metal;

$$-OR \text{ and } O-\overset{O}{\underset{}{C}}R$$

wherein R is alkyl of from 1 to about 10 carbon atoms;

$$-O-NR'$$

wherein R' is selected from the group consisting of phenyl, tolyl, phenylene isocyanate, tolylene isocyanate and ionic forms thereof with an alkali metal; and pyridine, pyrimidine and triazine.

6. The composition of claim 5 wherein Z is derived from toluene diisocyanate in ionic bond with an alkali metal.

7. The composition of claim 5 wherein M is selected from the group consisting of sodium, lithium and potassium.

8. The composition of claim 1 wherein the molecular weight of the copolymer is in the range of from 1,000 to 300,000.

9. An organic fluid composition comprising a major amount of a lubricating oil and a minor amount of the copolymer of claim 10 in admixture with a minor amount sufficient to provide lubricant improving properties to said lubricating oil of a lubricating oil additive selected from the group consisting of an alkali metal and alkaline earth metal sulfonate, an alkali metal and alkaline earth metal phenate, a sulfurized olefin, and an ester, imide and alkali metal and alkaline earth metal salt of an alkenylsuccinic acid.

10. The composition of claim 1 wherein the copolymer is a hydrogenated butadiene-styrene ethylene oxide block copolymer terminated with toluene diisocyanate.

11. The composition of claim 1 wherein the copolymer is an AB or BAB copolymer, A being the said oil soluble segment and B being the said polar segment.

12. The composition of claim 1 wherein the copolymer is terminated by reaction with trimethoxysilane.

* * * * *